Jan. 16, 1968 W. G. GORMAN 3,363,808
LIQUID METERING DEVICE
Filed June 7, 1966
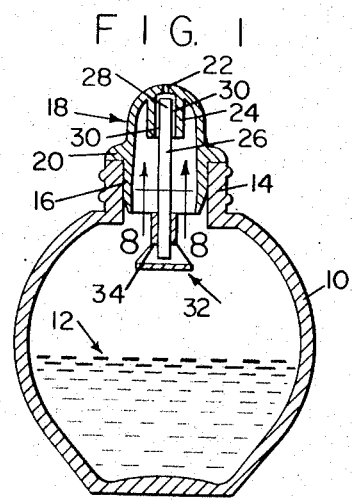
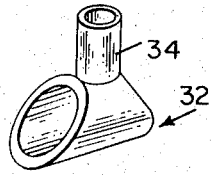
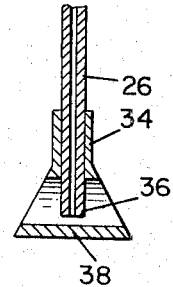
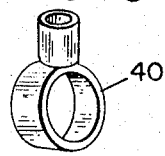
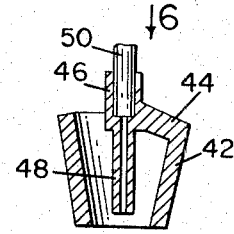
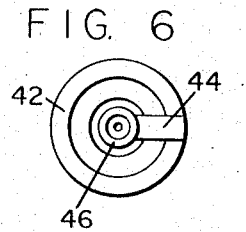
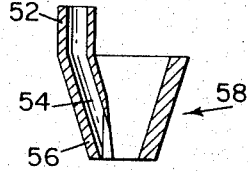
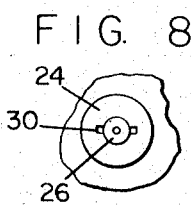
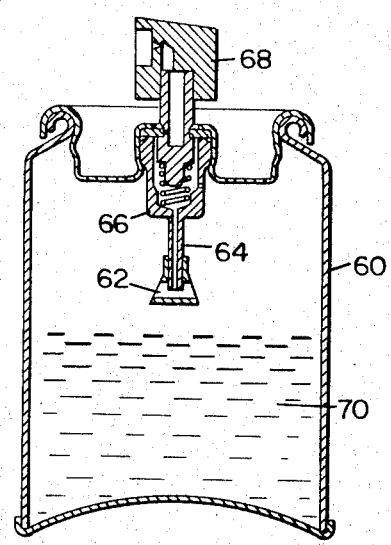
INVENTOR
WILLIAM G. GORMAN
BY *Charles R. Fay*
ATTORNEY ered Jan. 16, 1968

United States Patent Office 3,363,808
Patented Jan. 16, 1968

3,363,808
LIQUID METERING DEVICE
William G. Gorman, East Greenbush, N.Y., assignor to Sterling Drug Inc., New York, N.Y., a corporation of Delaware
Filed June 7, 1966, Ser. No. 555,882
13 Claims. (Cl. 222—193)

ABSTRACT OF THE DISCLOSURE

A liquid metering device which may be either a squeeze bottle or an aerosol container in which there is provided a capillary tube extending into the container and at the inner end of the capillary tube there is a metering container which is open at its sides or at the bottom in such a way that it would not hold fluid therein except through capillary action and because of this, the metering container receives an evenly reproducible amount of fluid in condition to be expelled through the tube to the atmosphere.

---

This invention relates to a liquid metering device particularly adapted for hand-held use although the invention is not limited thereto. It is frequently desirable to meter or repeatedly measure small volumes of liquid in a rapid and consisted manner. The invention pertains e.g. to a squeeze bottle unit such as may be used for nasal and throat sprays, deodorants, antiseptics, etc.; the invention is also easily provided in atomizer or nebulizer units operated by squeeze bulbs or even in pressurized (aerosol) units. Also the present invention is used to discharge a metered volume of liquid in the form of a stream or as drops if desired.

Although the general construction of the device may be varied in many ways, the essential elements of the invention reside in an open container which may be in the form of a cup, a ring or a tube, etc., this container having a tubular connection in the form of a capillary tube for draining or dispensing the liquid metered by the container, these parts being located in a container of the material to be metered. If it is desired to form a spray rather than to meter or deliver the liquid in the form of a stream or drops, a squeeze bottle nebulizer can be provided with an air passage adjacent the discharge end of the capillary tube so that air pressure in the passage causes the fluid in the capillary tube to be drawn out as by an injection action, and at the same time a relatively small opening in a cap covering the discharge end of the tube acts as a break-up device forming the spray.

Other objects and advantages of the invention will appear hereinafter.

Reference is to be had to the accompanying drawings in which:

FIG. 1 is a cross sectional view through a form of the device utilizing a squeeze bottle;

FIG. 2 is an enlarged perspective view of the metering container;

FIG. 3 is a perspective view of a modified type of metering container;

FIG. 4 is a cross sectional view through the metering container and dip-tube of FIG. 2;

FIG. 5 is a cross sectional view through a different form of metering container;

FIG. 6 is a top plan view thereof looking in the direction of arrow 6 in FIG. 5;

FIG. 7 is a view of a modified metering container;

FIG. 8 is an enlarged section on line 8—8 of FIG. 1, and

FIG. 9 is a sectional view illustrating the invention applied to a pressurized container.

In order to explain the invention, the same has been shown as associated with a main container, here shown as a squeeze bottle 10. Other kinds of bottles, aerosols, etc. may also be used but the principle of the invention will be clear from the following description.

The proposed or general liquid level in the main container or squeeze bottle is shown at 12 and this squeeze bottle may be provided with an exteriorly threaded neck 14 for the reception of an overall cap if desired. The interior of the neck in this case is preferably smooth-sided as shown to receive the skirt 16 of the spray plug 18, but other connections can be used. The skirt 16 may be beveled for easy insertion in the neck of the bottle and it is held therein by a friction fit. The plug of course can be held in the position shown in FIG. 1 by any other means desired.

It is preferred that the spray plug should have an annular shoulder as at 20 forming a stop against the rim of the neck 14 so that the parts are easily positioned as shown. The spray plug has a very small orifice or orifices at 22, the skirt 16 being completely open to the interior of the bottle as shown. Surrounding the orifice 22 there is an inwardly directed cylindrical construction 24 which receives and holds the dip or capillary tube 26 with the discharge end thereof as at 28 slightly spaced with relation to the inner surface of the spray plug at the orifice 22. This cylindrical construction 24 is provided with air passages at 30, 30 extending from end to end thereof, so that there is passage for air as for instance from the interior of the bottle to pass the discharge end of the dip-tube 26 and proceed out through the orifice 22. The dip-tube 26 is securely anchored to the cylindrical construction 24.

At its lower end the dip-tube 26 extends down into the bottle but above the predetermined surface of the liquid at 12 and is anchored in a metering container or cup or the like which is generally indicated by the reference character 32. This metering cup is in the form of a cylinder open at both ends and as a practical matter may have a cylindrical member 34 thereon in which the lower end of the dip-tube 26 is anchored. The dip-tube as clearly shown in FIGS. 1 and 4 has an entrance end 36 which extends close to the bottom surface 38 of the metering cup 32. This cup or container as shown has truncated angled ends and being open at both ends this assures a complete filling from either end and avoids overfilling or trapped air bubbles which might lead to underfilling.

In the use of the device, the squeeze bottle is either shaken or momentarily inverted so that the cup 32 becomes filled with a reproducible volume of liquid, after which a squeeze of the main container bottle 10 discharges the measured amount of liquid as a spray by forcing air in the squeeze bottle above the liquid level 12 up through the plug 18 into passage 30 past the discharge end at 28 of the dip-tube and out the orifice 22 causing the contents of the dip-tube to be carried along therewith in the form of a spray. The unit can be made to discharge all of the liquid before the pressure drops at the end of the squeeze and it is therefore possible to produce finer sprays than when this metered device is not employed.

Similar metering performance can be obtained in atomizer or nebulizer units operated by a squeeze bulb or even in pressurized (aerosol) units simply by utilizing this device in the proper position in such a container. It is also possible to discharge a metered volume of liquid in the form of a stream or as drops if desired so as to dispense vitamin drops, liquids, sweeteners, etc. in a metered but liquid condition. In order to do this, air pressure would be provided either by squeeze bottle or aerosol.

In order to show that the metering cup may take many different conformations, FIG. 3 shows a modification where the cup which is indicated at 40 is in the form of a ring. This ring is of course open at both sides and will retain and measure a predetermined volume of liquid therein but the operation of the device remains as above described, the ring being substantially the equivalent of the cup 32. FIGS. 5 and 6 show a concentric cup type of device in which the cup at 42 is slightly conical and is open at both ends having a strut 44 by which to support the cylindrical conformation 46 with the restricted tube 48, the cylindrical formation 46 receiving and holding the entrance end of the dip-tube 50.

This is varied somewhat by an eccentric cup type which has a cylindrical formation 52 to hold the dip-tube and a restricted tube 54 in prolongation thereof extends down the side wall 56 of the cup generally indicated at 58. This cup is also open at both ends and operates the same way.

That is, when the metering container or cup, regardless of its shape, size or method of filling, is provided with the fluid content desired, this content can then be utilized in a spray as above described or it can be forced out as a fluid in the event that a spray is not desired. The various shapes and constructions of the metering cups accommodate a large array of different fluids.

Referring to FIG. 9, the invention is shown as applied to a pressurized container 60 such as an aerosol. A metering cup 62 as above described is applied to the end of a tube 64 of a valve tank 66. The actuator 68 and its operative parts are conventional. The operation is similar to that described as to squeeze bottles. The product, which may be either a two or three phase system, is forced out of the cup 62 by internal pressure when the valve is actuated. This action is due to the vapor phase of the propellant even though the product and propellant are mixed at 70, the valve being actuated in vertical condition.

Having thus described my invention and the advantages thereof, I do not wish to be limited to the details herein disclosed, otherwise than as set forth in the claims, but what I claim is:

1. A liquid metering device comprising a main container having an orifice, a capillary tube having an intake end and a discharge end, means mounting the tube in the container with the discharge end leading to the orifice, an open metering means mounted at the intake end of said tube within the main container, said metering means receiving a measured amount of fluid from said main container in condition to be expelled through the tube to the atmosphere, said metering container having at least one opening receiving the fluid and retaining the fluid by capillary action and means for forcing air out of the container by and through the metering means to pick up the fluid therein and discharge it through the said orifice.

2. The liquid metering device of claim 1 wherein the intake end of the tube extends to a point within the metering means.

3. The liquid metering device of claim 1 wherein the intake end of the tube extends to a point within the metering means adjacent a side wall thereof.

4. The liquid metering device of claim 1 in which said metering means is open at opposite sides of the tube.

5. The liquid metering device of claim 1 in which said metering means is open at opposite sides of the tube laterally thereof.

6. The liquid metering device of claim 1 wherein the metering means is open at at least two spaced areas, said areas being spaced longitudinally of the tube.

7. The liquid metering device of claim 1 wherein said metering means is in the form of a ring, the tube being located radially thereof.

8. The liquid metering device of claim 1 wherein the metering means is open at at least two spaced areas, said areas being spaced longitudinally of the tube, the tube being located centrally of the open areas.

9. The liquid metering device of claim 1 wherein the metering means is open at at least two spaced areas, said areas being spaced longitudinally of the tube, the tube being located eccentrically relative to the open areas.

10. The liquid metering device of claim 1 wherein the tube is a dip-tube and the container is fabricated from a resilient material to form a squeeze bottle.

11. The liquid metering device of claim 1 wherein the container is pressurized.

12. The liquid metering device of claim 1 wherein the container is pressurized and includes a valve tank, the tube being associated therewith.

13. The liquid metering device of claim 1 wherein the container is pressurized and includes a valve tank, the tube being associated therewith and a valve for the valve tank.

References Cited

UNITED STATES PATENTS

| | | | |
|---|---|---|---|
| 2,064,726 | 12/1936 | Brown | 239—350 |
| 2,578,907 | 12/1951 | Tupper | 222—215 XR |
| 3,114,483 | 12/1963 | Kappel | 222—402.24 |
| 3,157,314 | 11/1964 | Nadler | 222—215 XR |

FOREIGN PATENTS

| | | |
|---|---|---|
| 655,684 | 12/1928 | France. |

WALTER SOBIN, *Primary Examiner.*